2 Sheets—Sheet 1.

T. T. PROSSER.
Grain-Cart.

No. 224,725. Patented Feb. 17, 1880.

Witnesses.
Inventor.

2 Sheets—Sheet 2.

T. T. PROSSER.
Grain-Cart.

No. 224,725. Patented Feb. 17, 1880.

Witnesses.
Inventor.

UNITED STATES PATENT OFFICE.

TREAT T. PROSSER, OF CHICAGO, ILLINOIS.

GRAIN-CART.

SPECIFICATION forming part of Letters Patent No. 224,725, dated February 17, 1880.

Application filed November 1, 1879.

*To all whom it may concern:*

Be it known that I, TREAT T. PROSSER, of Chicago, in the county of Cook and State of Illinois, have invented certain new and useful Improvements in Grain-Carts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to vehicles for transporting grain over common roads; and its object is to provide such a vehicle capable of carrying a comparatively large load and of easy draft, and of more especial value to farmers for transporting their grain to shipping-points.

To these ends my invention consists of a grain-cart composed of a pair of short hollow cylinders of large diameter adapted to receive the grain and to roll on the ground like a pair of wheels, being mounted on an axle to which the draft is applied.

In order that my invention may be clearly understood, I have shown in the annexed drawings, and will proceed to describe, the best form of my invention so far devised by me, it being understood that the details of construction may be varied without departing from the principle of my invention.

Figure 1:
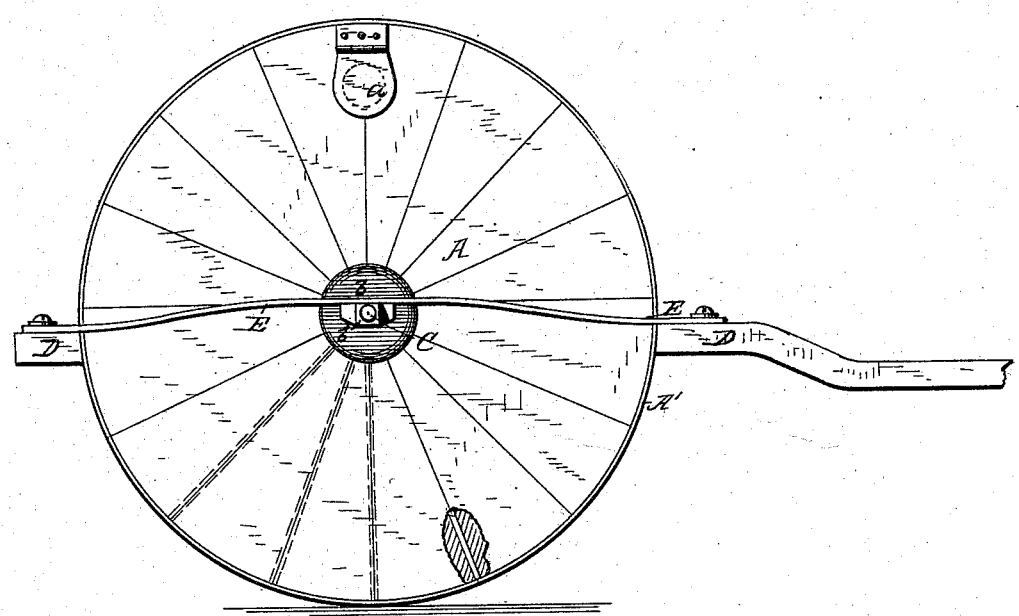
Figure 2:
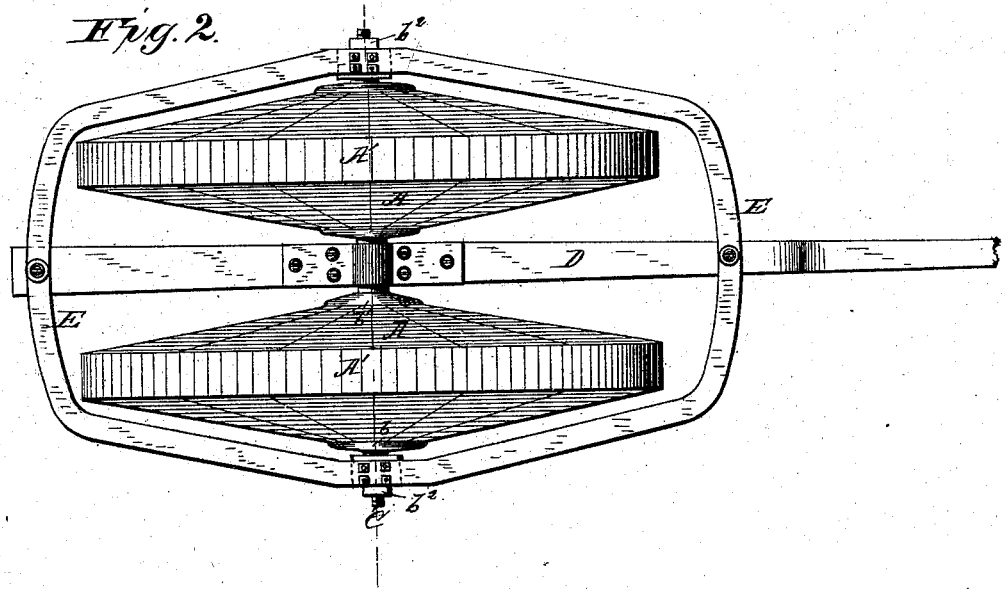
Figure 3:
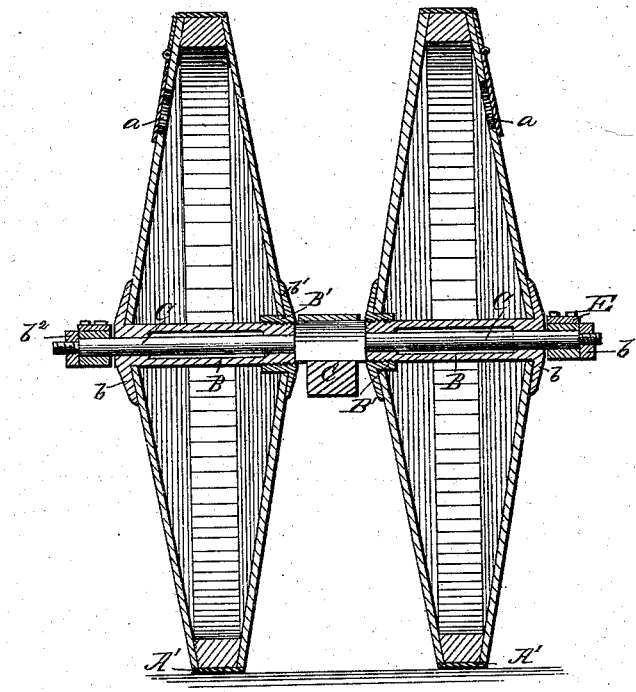

Figure 1 is a side elevation of my improved grain-cart. Fig. 2 is a plan thereof. Fig. 3 is a vertical transverse section in the axial plane of the cylinders.

The same letters of reference are used in all the figures in the designation of like parts.

A A refer to the hollow cylinders for the reception of the grain. These cylinders are to be made of large diameter and quite short at the periphery, so that they may run on the ground without cutting into it to any extent, notwithstanding their heavy weight when filled with grain. I prefer to make the cylinders bellying from the periphery toward the center, as shown in the drawings. This form possesses several important advantages. By it the capacity of the cylinder is largely increased without increasing its length at the periphery. It affords excellent facilities for unloading, because the grain will readily discharge itself, there being no sharp angles. It imparts great strength to the cylinders by the brace-like conformation of the cylinder-heads, so that these heads can be made comparatively light. I prefer to make the rim of the cylinder of wood fellies and the heads of thin boards, grooved at the edges and keyed together by long thin iron keys, as shown in Fig. 1. The heads should be bolted to the rim. Each cylinder is, at the center, provided with a box, B, provided with a flange, $b$, at one end, formed to fit the bellying head of the cylinder. The other end of the box is screw-threaded, to receive a nut, B', also constructed with a flange, $b'$, to fit the other bellying head of the cylinder. By tightening this nut the heads of the cylinder can be forced toward each other to put them under strain for the purpose of bracing the rim of the cylinder and of taking up any little looseness of the structure. The cylinder thus made should be provided with a suitable tire, A'. It should also be provided with a suitable opening or openings, $a$, near its periphery for loading and unloading purposes, which opening may be closed by a hinged cover or slide, as may be deemed most convenient. A pair of these cylinders are mounted on an axle, C, fitted in the boxes B of the cylinders. The axle may be enlarged for some distance along its central portion for the purpose of spacing the cylinders, so that a draft-pole, D, may be applied to the axle between the cylinders. I also prefer to mount a draft-frame, E, upon the protruding ends of the axle, so as to inclose the cylinders in the manner best shown in Fig. 2. In that case the rear end of the draft-pole or tongue is extended so that the draft-frame may be connected to the tongue front and rear. The extreme ends of the axle may be screw-threaded and provided with nuts $b^2$, in order to hold the draft-frame and cylinders in proper position. It will probably be expedient to make the tongue with a downward bend to get it on a proper level where the horses are hitched to it.

The cylinders revolve independently on the axle, so that they can readily accommodate themselves to the varying circumstances met with in traveling over a road.

A suitable seat for the driver may be mounted on the tongue, or on the draft-frame, if a draft-frame be used, and a suitable brake may also be constructed on the cart if deemed desirable or necessary.

The cylinders might be made with flat heads, and of considerable length for part of their diameter, and then reduced in length to obtain a rim of the requisite narrow tread; but I prefer the bellying form shown and described.

What I claim as my invention, and desire to secure by Letters Patent, is—

1. A twin-cylinder grain-cart, the cylinders of which carry the grain and roll on the ground, substantially as before set forth.

2. A twin-cylinder grain-cart, the cylinders of which carry the grain and are mounted to rotate independently on the axle in rolling over the ground, substantially as before set forth.

3. The combination, substantially as before set forth, of the cylinders adapted to roll on the ground, the axle, the tongue, and the draft-frame.

4. A cylinder for carrying grain adapted to roll on the ground, constructed with bellying heads, substantially as before set forth.

5. The combination, substantially as before set forth, of a cylinder for carrying grain by rolling over the ground, constructed with bellying heads, the flanged axle-box, and the flanged nut.

In testimony that I claim the foregoing I have hereunto set my hand this 30th day of October, 1879.

TREAT T. PROSSER.

Witnesses:
CHAS. A. NEALE,
F. L. OURAND.